Figure 12:
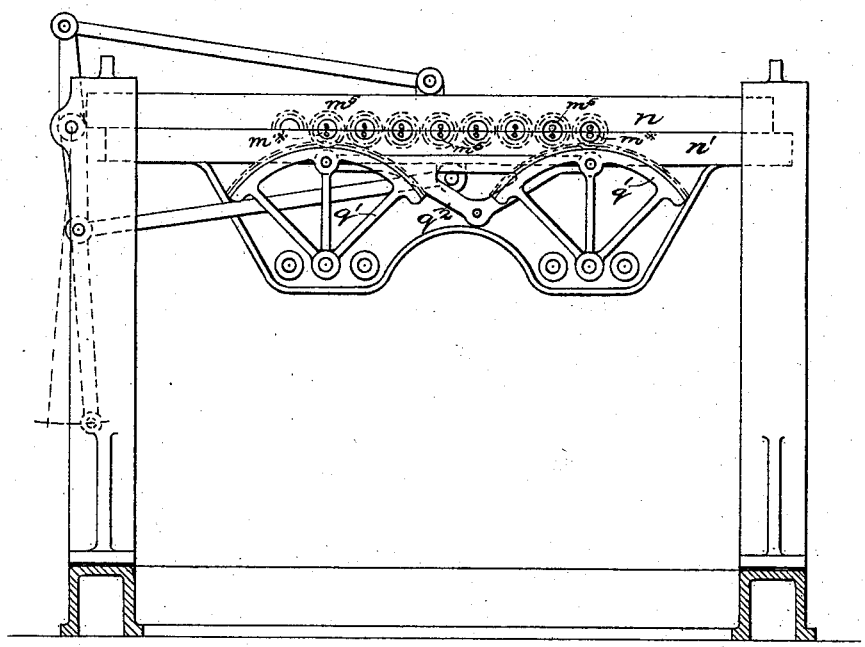

(No Model.) 3 Sheets—Sheet 1.
W. F. DENNIS.
MACHINE FOR MAKING WIRE NETTING.
No. 379,008. Patented Mar. 6, 1888.
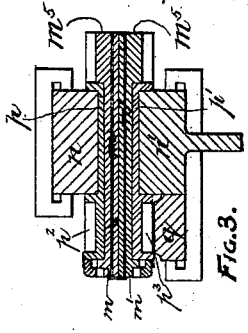
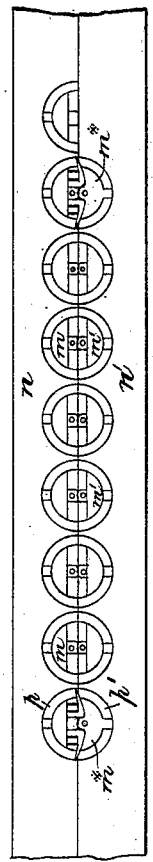
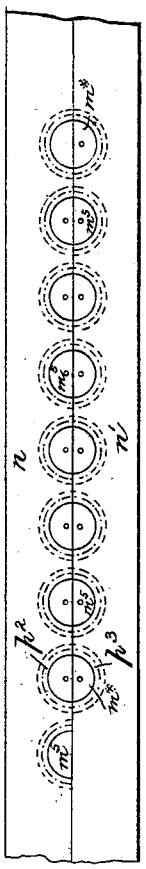
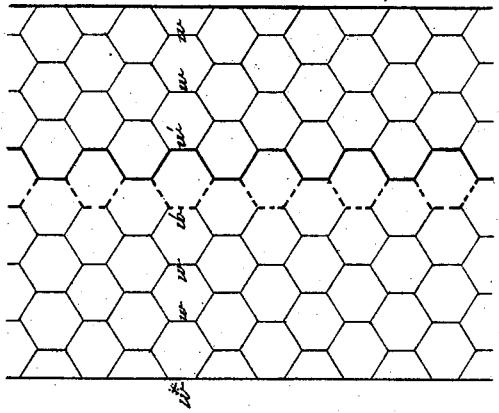
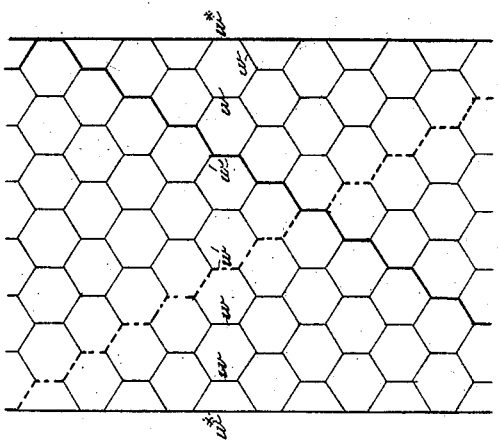
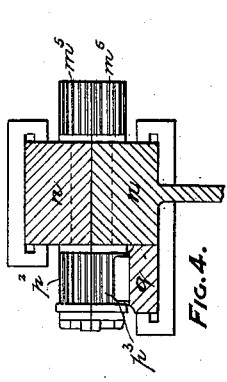
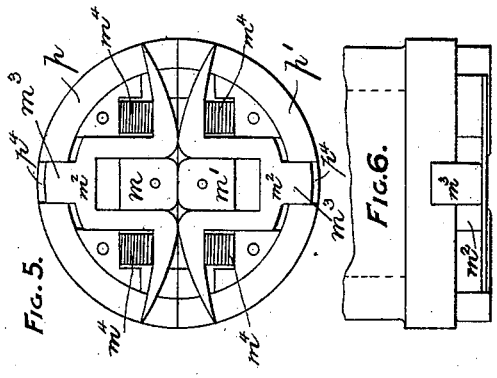
Witnesses.
E. B. Bolton
Frank Moulin
William F. Dennis,
Inventor.
By his Attorney,
Henry Connett (No Model.) 3 Sheets—Sheet 2.
W. F. DENNIS.
MACHINE FOR MAKING WIRE NETTING.
No. 379,008. Patented Mar. 6, 1888.
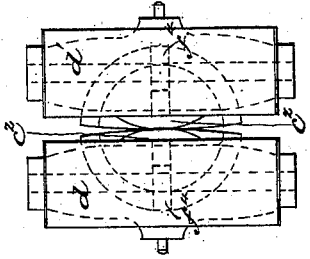
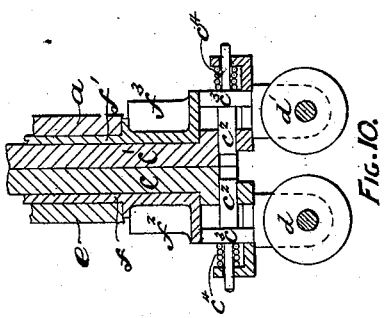
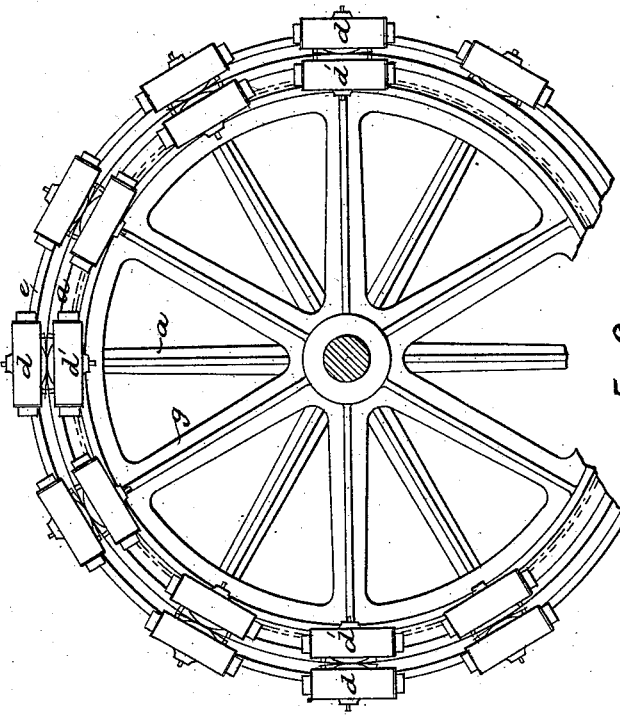
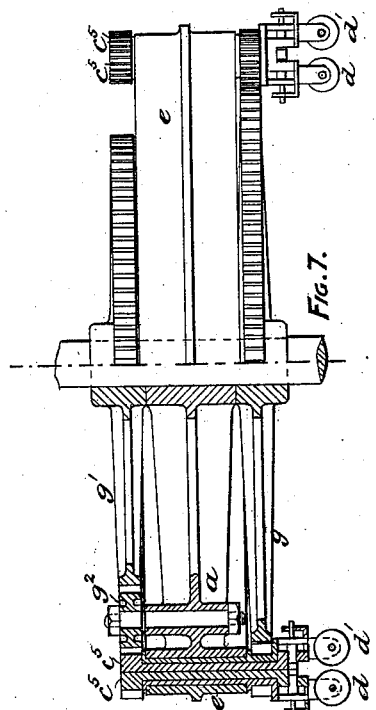
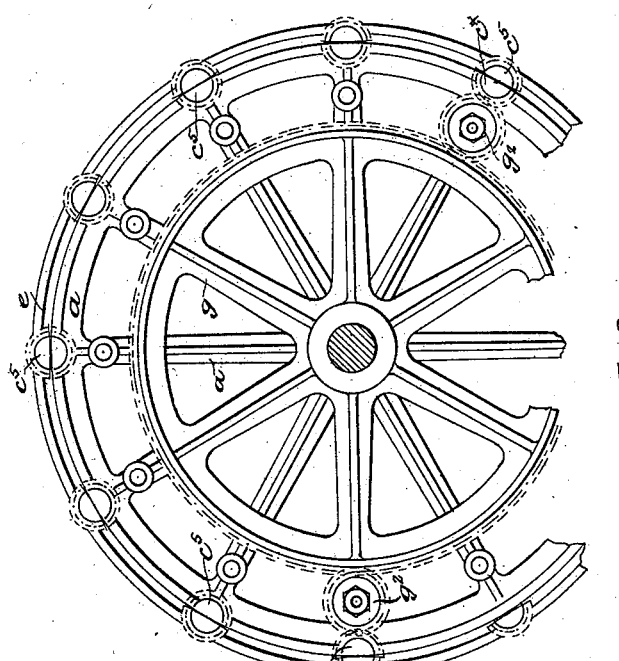
WITNESSES:
E. B. Bolton
Frank Moulin
INVENTOR:
William F. Dennis.
By his Attorney,
Henry Connett
N. PETERS, Photo-Lithographer, Washington, D.C.

(No Model.) 3 Sheets—Sheet 3.

W. F. DENNIS.
MACHINE FOR MAKING WIRE NETTING.

No. 379,008. Patented Mar. 6, 1888.

UNITED STATES PATENT OFFICE.

WILLIAM FREDERICK DENNIS, OF LONDON, ENGLAND.

MACHINE FOR MAKING WIRE-NETTING.

SPECIFICATION forming part of Letters Patent No. 379,008, dated March 6, 1888.

Application filed September 7, 1886. Serial No. 212,959. (No model.) Patented in England September 3, 1885, No. 10,456; in India December 9, 1885, No. 1,209; in Victoria December 12, 1885, No. 4,354; in Cape Colony February 5, 1886, No. 161; in Queensland February 6, 1886, No. 103; in Canada February 16, 1886, No. 23,437; in France February 24, 1886, No. 174,380; in Belgium February 24, 1886, No. 72,132; in New South Wales March 2, 1886, No. 568; in South Australia April 10, 1886, No. 672; in New Zealand April 15, 1886, No. 1,794; in Natal July 14, 1886, No. 9, and in Spain February 17, 1887, No. 6,720.

*To all whom it may concern:*

Be it known that I, WILLIAM FREDERICK DENNIS, a subject of the Queen of Great Britain and Ireland, residing in London, England, have invented new and useful Improvements in Machines for Making Wire-Netting, (for which I have obtained Letters Patent in the United Kingdom, No. 10,456, bearing date September 3, 1885; British India, No. 1,209, December 9, 1885; Victoria, No. 4,354, December 12, 1885; Cape Colony, No. 161, February 5, 1886; Queensland, No. 103, February 6, 1886; Canada, No. 23,437, February 16, 1886; France, No. 174,380, February 24, 1886; Belgium, No. 72,132, February 24, 1886; New South Wales, No. 568, March 2, 1886; Natal, No. 9, July 14, 1886; New Zealand, No. 1,794, April 15, 1886; South Australia, No. 672, April 10, 1886, and Spain, No. 6,720, February 17, 1887,) of which the following is a specification.

My invention relates to means applicable for the manufacture of netting in which the several wires forming the body of the netting travel gradually across from the selvage on one side to that on the other side, and then gradually return in the opposite direction. Netting of this kind possesses the advantage of greater regularity, both in appearance and strength, compared with that the machine described in the specification to my United States Letters Patent granted October 6, 1885, No. 327,924, was designed to produce. The means I am about to describe are, however, capable of adaptation to such a machine, as also to machines of the type hitherto commonly used and in which "springs" are employed.

For the purpose of explaining my invention, I shall describe it as adapted to a machine of the type referred to in my aforesaid previous specification—that is to say, a machine in which the wires about to be employed in the manufacture are carried on reels or bobbins mounted independently from the twisting mechanism, but partaking of motions corresponding with those appertaining to the spindles engaged in twisting the several pairs of wires together in the formation of the netting.

In order that my invention may be fully understood, I will proceed to describe it with reference to the accompanying drawings.

Similar letters of reference are used to indicate corresponding parts, so far as they occur, in each of the figures.

Figure 13:
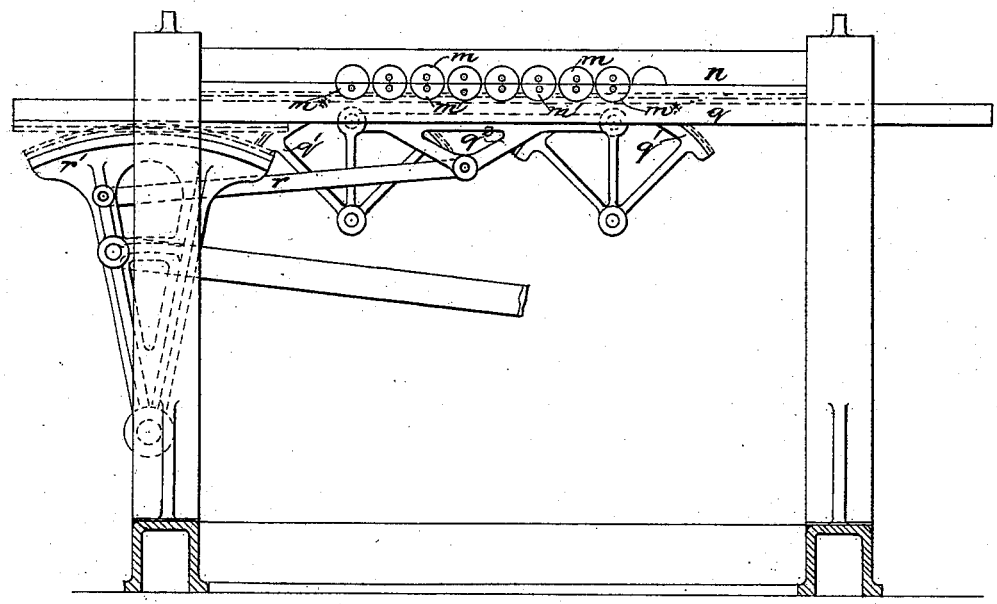

Figures 1 and 2 are front and back elevations, respectively, of the twisting mechanism, Fig. 3 being a longitudinal section through a bipart twisting-spindle, and Fig. 4 a transverse section through the reciprocating bars at a point between adjacent pairs of twisting-spindles. Fig. 5 is a face view of a twisting-spindle to an enlarged scale, Fig. 6 being a plan of same. Fig. 7 is a part plan and horizontal section of the countertwisting mechanism, Figs. 8 and 9 being back and front elevations, respectively, of same. Fig. 10 is a longitudinal section to an enlarged scale, showing a method of mounting the bobbins in the countertwisting apparatus; and Fig. 11 is a face view of the latter. Figs. 12 and 13 show back and front elevations, respectively, of the general arrangement of twisting mechanism and mode of operating the selvage-wires. Figs. 14 and 15 are comparative diagrams of wire-netting respectively produced by the machine herein described and that described in my aforesaid previous specification.

Referring in the first place to the mechanism engaged in pairing the several wires and twisting the same together in the formation of the netting—that is to say, the twisting apparatus—each of the wires intended to form the body of the netting or body-wires, as also each selvage-wire, passes longitudinally through a semi-cylindrical spindle. Each of these twisting-spindles is mounted in a semi-cylindrical bush or half-tube furnished externally with toothed gearing, two such half-tubes together forming a toothed sleeve surrounding each pair of twisting-spindles. The arrangement of these parts will be understood on reference to the sectional view, Fig. 3, in which $m\ m'$ are the twisting-spindles through which the wires pass longitudinally, and $p\ p'$ are the half-tubes furnished with toothed gears $p^2\ p^3$. The half-tubes $p\ p'$ are arranged in the contiguous faces of two parallel reciprocating bars, $n$ $n'$, and partake of to-and-fro lateral motions, while the bipart toothed sleeves gear with a toothed rack, $q$, whereby they are rotated in opposite directions at each successive operation of the machine.

The general arrangement of the semi-cylindrical twisting-spindles, surrounded by their bipart toothed sleeves and mounted in the contiguous faces of the reciprocating bars, is represented in the back and front elevations, Figs. 1 and 2. The rotary motion imparted to each bipart sleeve $p$ $p'$ is communicated to the pair of twisting-spindles, $m$ $m'$, embraced by it through clutches designed in such a manner as only to come into operation upon arrival opposite one another. One mode in which such clutch mechanism may be devised is represented to an enlarged scale in Figs. 5 and 6, the former of these being a face view and the latter a plan.

$m^2$ is a sliding piece formed with laterally-projecting horns, the inwardly-facing sides of which are inclined, as shown. Each sliding piece $m^2$ is mounted between projecting portions of the extremity of the twisting-spindle $m$ or $m'$, and is furnished with a projection, $m^3$, adapted for engaging in a notch, $p^4$, in the sleeve $p$ or $p'$. When a pair of twisting-spindles furnished with clutches or sliding pieces—such as $m^2$—are laterally slid opposite one another so as to arrive in the relative positions represented in Fig. 5, the sliding pieces $m^2$ force each other outward by the mutual action of their inclined surfaces, and cause the projection $m^3$ of each to enter a notch, $p^4$, whereupon the bipart sleeve $p$ $p'$ becomes locked with the inclosed pair of twisting-spindles $m$ $m'$. In this condition the bipart sleeve $p$ $p'$ is capable of imparting to the pair of twisting-spindles $m$ $m'$ the rotative motion which the former receives through the toothed gears $p^2$ $p^3$ from the rack $q$. Upon the half-sleeves and spindles being moved laterally in opposite directions, and thus ceasing to occupy positions immediately facing one another, the spiral springs $m^4$ operate to force the sliding pieces $m^2$ inward, and to withdraw the projections $m^3$ of the sliding pieces from the notches $p^4$ of the half-sleeves, whereupon the twisting-spindles are released from gear with their surrounding sleeves. All the spindles $m$ $m'$ are furnished with sliding pieces, such as $m^2$, for the purpose of effecting the locking of the bipart sleeves to their inclosed twisting-spindles, excepting only the two twisting-spindles through which the selvage-wires pass. From these the sliding pieces $m^2$ are omitted. The opposite extremities of the twisting-spindles are furnished with half-pinions $m^5$, as indicated in the sectional views, Figs. 3 and 4, and in the face view, Fig. 2.

In Figs. 1 and 2 is shown a pair of reciprocating bars, $n$ $n'$, in which is mounted a series of twisting-spindles, $m$ $m'$, with their bipart sleeves $p$ $p'$, the latter provided with toothed gears $p^2$ $p^3$. In Fig. 2 the clutches are for the most part hidden behind guard-plates, which, for explanatory purposes, are omitted in Fig. 5.

In Figs. 1 and 2 the spindles marked $m^*$ are intended for carrying the selvage-wires, and it will be observed that these spindles are unprovided with the sliding pieces $m^2$, as before stated. A further portion of the apparatus (represented in Figs. 12 and 13) consists of two toothed quadrants or sectors respectively arranged to gear with the half-pinions formed on or attached to the back extremities of the selvage-wire-twisting spindles and their (for the time being) companion spindles.

$q'$ $q'$ are the sectors mounted in a downwardly-extending portion of the bar $n'$ and suitably disposed for gearing with the half-pinions of the selvage-wire spindles $m^*$. The sectors $q'$ $q'$, moving in unison, may be coupled together by means of a link, $q^3$, and the requisite vibratory motions may be imparted to the sectors through this link by connecting the latter with the sector $r'$ by means of a rod, $r$. Mechanism for actuating the bars $n$ $n'$ and the rack $q$ does not constitute an essential portion of this invention, wherefore the description does not extend thereto. In working the sectors $q'$ $q'$ from the sector $r'$, whereby the rack $q$ is operated, the rod $r$ is connected to the sector $r'$, as shown in Fig. 13, at such a radial distance from the pivot of the latter as to impart a smaller peripheral motion to the sectors $q'$ $q'$ than that appertaining to the sector $r'$, the object being to rotate the pairs of twisting-spindles $m^*$ $m^*$ at each operation of the machine half a revolution less than the number of revolutions performed by the bipart sleeves $p$ $p'$, the latter remaining constantly in gear with the rack $q$.

I have shown the bars $n$ $n'$ as straight; but they may be bent into a circular form as well.

The action of the apparatus is as follows: Assuming the several pairs of wires forming the body of the netting are required to present in the finished product two complete twists, each toothed and bipart sleeve $p$ $p'$ has imparted to it two and a half revolutions, the same being communicated through the locking-pieces $m^2$ and notches $p^4$ to the twisting-spindles $m$ $m'$. The selvage-wire spindles $m^*$ being, however, unprovided with sliding pieces, such as $m^2$, or other locking devices, the bipart sleeves surrounding the spindles and their companion spindles are free to revolve without rotating the twisting-spindles inclosed by them. These two pairs of spindles are independently operated by the sectors $q'$ $q'$, which gear with the bipart pinions $m^5$ and impart two revolutions to the said spindles.

It will thus be understood that although a bipart sleeve, $p$ $p'$, surrounding a selvage-wire spindle and its fellow spindle, being constantly engaged with the rack $q$, makes two and a half revolutions, the said pair of spindles makes only two revolutions, which motion it derives from one of the sectors $q'$. It results that the twisting-spindles carrying the selvage-wires constantly return to the same position, while the relative positions of the twisting-spindles appertaining to the body-wires constantly vary in a manner which will be readily understood from the following description of the arrangement and operation of the countertwisting mechanism.

This apparatus may be arranged on the circular system, as shown in Figs. 8 and 9, or rectilineally. In either case it is subject to certain modifications similar in character to those effected in the twisting mechanism. The working of the bobbins also corresponds with that appertaining to the twisting-spindles.

Assuming the wire-charged reels to be carried by means of semi-cylindrical spindles arranged in two series, respectively mounted in the outer periphery of a disk and in the inner periphery of a circumscribing ring, as illustrated by the part horizontal section, Fig. 7, and the part back and front elevations, Figs. 8 and 9, instead of rotating the several pairs of bobbins $d$ $d'$ two, three, or other complete number of turns, I rotate the several pairs two and a half, three and a half, or other odd half number of times, and according to the number of revolutions imparted to the pairs of twisting-spindles. Alternating with these successive rotary motions of the bobbin-spindles $c$ $c'$, the disk $a$, carrying one of the series of bobbins $d$, partakes of to-and-fro rotative movements, whereby the bobbins constituting each pair become constantly interchanged. Tracing now the course of a bobbin-spindle assumed to be carried at starting in the circumscribing ring $e$, after (say) two and a half revolutions the said spindle comes to rest in the disk $a$. The spindle is then moved laterally and paired with a different fellow spindle, in company with which it is rotated two and a half revolutions in the reverse direction and again arrives in the outer ring, $e$, but in the next adjacent bearing to that originally occupied by it. The disk $a$ then returns to its previous position, whereupon the spindle under observation again becomes paired with a different companion spindle, and, having been rotated therewith, again arrives in the disk, but in the next adjacent bearing to that previously occupied by it in that body. In the result a moiety of the bobbins travel in one general direction until they successively arrive opposite the selvage-wire bobbin occupying one extremity of the series of bobbins engaged, while the remainder travel in the reverse direction until they successively arrive opposite the selvage-wire bobbin at the opposite extremity of the series.

The bobbins carrying the selvage-wires do not travel in the manner above described, but are respectively retained at the two extremities of the series of bobbins engaged. With this object the spindles to which they are attached are rotated half a turn less than those attached to the bobbins carrying the ordinary wires for forming the body of the netting—that is to say, they perform an even instead of an odd number of half-revolutions, and therefore constantly return to the same positions. To effect this result, each bobbin-spindle $c$ $c'$ is mounted in a semi-cylindrical bush or half-tube, $f$ $f'$, in the same manner as already described with reference to the twisting-spindles, each half-tube carrying a toothed gear, $f^2$ $f^3$, and connected with its inclosed pair of bobbin-spindles $c$ $c'$ through a locking device, which may be substantially of the kind hereinbefore described with reference to the twisting mechanism. This device is shown to an enlarged scale in Fig. 10, which is a sectional view taken longitudinally of the bobbin-spindles, Fig. 11 being a face view of the same.

$d$ $d'$ are the bobbins mounted on semi-cylindrical spindles $c$ $c'$, inclosed within bipart tubes or sleeves $f$ $f'$, the exteriors of which are furnished with toothed gears $f^2$ $f^3$. Each bobbin-spindle (except $c^*$ $c^*$, carrying the selvage-wire bobbins) is furnished with a sliding piece, $c^2$, formed with laterally-projecting wings, the inwardly-facing sides of which are inclined. Each sliding piece is suitably mounted in the extremity of the bobbin-spindle $c$ or $c'$, and is furnished with a projection, $c^3$, adapted for engaging in the notch $f^4$, formed in the half-sleeve $f$ or $f'$. Upon a pair of the bobbin-spindles arriving opposite one another, the sliding pieces $c^2$ are forced outward, their projections $c^3$ entering the notches $f^4$ in the bipart sleeves and locking the said sleeves to the spindles, the latter thereupon becoming subjected to the rotary motion imparted to the sleeves through their toothed gears $f^2$ $f^3$. Upon the pair of bobbin-spindles ceasing to occupy positions immediately facing one another, the spiral springs $c^4$ come into operation to force the sliding pieces $c^2$ inward and to release the bobbin-spindles from their surrounding sleeves. The spindles $c^*$ $c^*$, appertaining to the bobbins carrying the selvage-wires, are unprovided with the sliding pieces $c^2$ or other locking devices, and consequently they and their (for the time being) companion spindles are not liable to become locked with or to be rotated by their surrounding bipart sleeves. The bobbin-spindles are furnished at their opposite extremities with half-pinions $c^5$, as indicated in Figs. 7 and 8, the functions of which will appear hereinafter.

The bipart sleeves $f$ $f'$, with their inclosed bobbin-spindles $c$ $c'$, are mounted, as regards each series, in a movable disk, $a$, and stationary circumscribing ring $e$. The toothed bipart sleeves $f$ $f'$ gear with the spur-wheel $g$, whereby they are rotated the required number of turns—that is to say, the number of revolutions imparted to the body-wire twisting spindles. At the opposite extremities of the bobbin-spindles the bipart pinions appertaining to the selvage-wire-bobbin spindles and their (for the time being) companion spindles gear with the spur-wheel $g'$ through the intervention of idle-wheels $g^2$. The diameter or peripheral speed of the spur-wheel $g'$, operating the selvage-wire-bobbin spindles, is so proportioned to that of the spur-wheel $g$, operating the sleeves connected with the body-wire-bobbin spindles, as to cause the first-named spindles to make at each operation of the machine half a revolution less than the number performed by the last-named spindles. This difference corresponds with that prevailing between the motions of the pairs of twisting-spindles appertaining to the body-wires and selvage-wires, respectively. Owing to the intervention of the idle-wheels $g^2$, it should be observed that the spur-wheels $g$ and $g'$ require to be rotated in opposite directions. Suitable means for actuating the spur-wheels $g$ $g'$, as also for imparting the requisite to-and-fro motions to the disk $a$, may be readily devised; but inasmuch as these means do not constitute essential features of my present invention they are omitted from the description.

The peculiar character of the netting resulting from the system of manufacture herein described will be readily understood from the diagram, Fig. 14, wherein $w$ $w$ are body-wires, and $w^*$ $w^*$ the selvage-wires, two of the body-wires $w'$ $w'$ being distinguished by strong lines with a view to indicating the course such wires follow in traveling diagonally across the netting from selvage to selvage and then gradually returning by similar steps. For the purpose of comparison, the course pursued by two body-wires, $w'$ $w'$, in ordinary machine-made netting is indicated in Fig. 15, each two adjacent wires being, in this instance, alternately twisted with each other and with their laterally-contiguous wires.

It will be perceived that the means herein described for the manufacture of diagonally-wired netting are applicable to machines in which one series of wires are carried on reels and the other series are coiled and formed into "springs." In such an adaptation the half-pinions are disconnected from the twisting-spindles and mounted on semi-cylindrical bushes fitted to the said spindles, the connection between these being effected by means of clutches, which ordinarily cause the spindles to be rotated in unison with the sleeves, but permit the sleeves to revolve freely when in conjunction with the selvage-wire spindles, the latter spindles being operated by independent means and performing half a revolution less (or half a revolution more, if preferred) than the body-wire spindles. For the production of netting having the body-wires traveling diagonally from selvage to selvage and presenting an even number of twists, it would also be necessary to adjust the motion of the rack operating the toothed sleeves so as to impart an odd number of half-revolutions to the body-wire-twisting spindles.

According to the method of manufacturing wire-netting hereinbefore particularly described, (as also by the system particularly described in the specification of my aforesaid Letters Patent No. 327,924,) "hard" or "bright" wire may be employed—that is to say, wire which has not been annealed subsequently to undergoing its final drawing. Such wire has a polished surface and takes up less spelter in the galvanizing-bath. It also possesses greater rigidity as compared with "black" or annealed wire, netting manufactured from the former presenting greater natural stiffness and capability of withstanding rough usage.

I do not herein claim diagonally-wired netting as a product, but my improved means or mechanism for making such netting.

What I claim, and desire to secure by Letters Patent of the United States, is—

1. In a machine for making wire-netting, the semi-cylindrical spindles which carry the wires, having bipart driving-sleeves, substantially as set forth.

2. In a machine for making wire-netting, the combination, with semi-cylindrical spindles provided with longitudinal passages for the wire, of bipart sleeves embracing said spindles and providing bearings therefor, and clutch devices, substantially as described, whereby the spindles are compelled to rotate with the sleeves when required so to do.

3. In a machine for making wire-netting, the combination, with the bars $n$ $n'$ and mechanism for imparting reciprocating motion thereto, of the bipart sleeves mounted rotatively in said bars, mechanism for imparting rotary motion to said sleeves, the semi-cylindrical twisting-spindles mounted in said sleeves, and automatic clutch mechanism carried by said spindles, substantially as and for the purposes set forth.

4. In a machine for making wire-netting, the combination, with the bipart sleeves $p$ $p'$, of the semi-cylindrical spindles $m$ $m'$ and the clutch mechanism borne by said spindles, said mechanism comprising the horned sliding pieces $m^2$ $m^2$, having projections $m^3$, to engage recesses $p^4$ in the sleeves, and springs $m^4$, substantially as set forth.

5. In a machine for making diagonally-wired netting, the combination, with the continuous bars in which the twisting-spindles are mounted, and mechanism for imparting a reciprocating motion to said bars, of the semi-cylindrical twisting-spindles, mechanism for imparting to the body-wire or intermediate spindles an odd number of half-revolutions, first in one direction and then in the other, and mechanism for imparting to the selvage-wire or terminal spindles an even number of half-revolutions, whereby the spindles carrying the body-wires are caused to travel gradually to and fro from one end of the series to the other.

WILLIAM FREDERICK DENNIS.

Witnesses:
ARTHUR W. McLELLAN,
GEORGE PERCY SKELSEY.